United States Patent
Chukka et al.

(10) Patent No.: US 9,407,382 B1
(45) Date of Patent: Aug. 2, 2016

(54) POSITIONING STUB FOR MITIGATION OF RETURN LOSS DURING SIGNAL TRANSMISSION

(71) Applicant: SPRINT COMMUNICATIONS COMPANY, L.P., Overland Park, KS (US)

(72) Inventors: Chaitanya Chukka, Overland Park, KS (US); Eugene S. Mitchell, Jr., Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/669,627

(22) Filed: Mar. 26, 2015

(51) Int. Cl.
*H04B 1/02* (2006.01)
*H04B 17/10* (2015.01)
*H04W 24/02* (2009.01)

(52) U.S. Cl.
CPC ............. *H04B 17/103* (2015.01); *H04W 24/02* (2013.01)

(58) Field of Classification Search
CPC .......... H04B 1/0458; H04B 1/04; H03H 7/38
USPC ................................ 455/91, 107, 114.1, 114.2
See application file for complete search history.

(56) References Cited

U.S. PATENT DOCUMENTS

| | | | | |
|---|---|---|---|---|
| 5,023,866 A | * | 6/1991 | De Muro | H01P 1/2136 333/126 |
| 2001/0000428 A1 | * | 4/2001 | Abadeer | H04L 25/0278 333/33 |

* cited by examiner

*Primary Examiner* — Tuan Pham

(57) ABSTRACT

A device, apparatus, and method are provided for mitigation of return loss during signal transmission. The device comprises a radio transmitter and a radio antenna coupled by a signal transmission line, the radio antenna configured to broadcast over air a radio signal transmitted by the radio transmitter, the signal transmission line configured to transmit the radio signal to the radio antenna along a signal path. The device further comprises a positioning stub coupled to the radio transmitter, the radio antenna, and the signal transmission line, the positioning stub configured to move to different locations along the signal path to dynamically change the impedance of the signal path to reduce signal return loss.

20 Claims, 3 Drawing Sheets

POSITIONING STUB FOR MITIGATION OF RETURN LOSS DURING SIGNAL TRANSMISSION

BACKGROUND

Return loss is a commonly known problem in radio and telecommunications signal transmission. Return loss occurs when a signal is transmitted by an active component through one or more passive components to an antenna for broadcasting. The impedance of the signal path is often matched to that of the antenna to minimize return loss. However, during signal transmission, a part of the transmitted signal from the active component is often returned or reflected by a discontinuity in the signal path due to mismatched impedances. This reduces signal output strength, and causes return loss. Return loss may be caused by capacitance, cable bending, defects, poor maintenance, and/or temperature, among other factors. For a given set of telecommunications signal transmission equipment, a maximum level of signal return loss is often established, above which repair or replacement of the equipment is required to maintain a desired minimum level of performance. This repair can be costly and dangerous for repair crews, who must climb transmission towers to replace defective signal transmission equipment. Due to the costs and risks of managing signal return loss, a better method of matching impedances in a signal path to mitigate signal return loss is needed.

SUMMARY

Embodiments of the invention are defined by the claims below, not this summary. A high-level overview of various aspects of the invention is provided here for explanation purposes, to provide an overview of the disclosure, and to introduce a selection of concepts that are further described below in the detailed-description. This summary is not intended to identify key features or essential features of the claimed subject matter, nor is it intended to be used as an aid in isolation to determine the scope of the claimed subject matter. The scope of the invention is defined by the claims.

In brief, at a high level, this disclosure describes, among other things, a device, apparatus, and method for mitigation of signal return loss in a signal transmission system. The device or apparatus includes at least a radio transmitter, a signal transmission line, and a radio antenna coupled together to form a signal path. The device also includes a positioning stub coupled to the radio transmitter, the signal transmission line, and the radio antenna at different locations along the signal path. The positioning stub may be moved or positioned at the different locations along the signal path to change the impedance of the signal path to match that of the antenna, providing an adjustable component that dynamically reduces signal return loss during operation of the signal transmission system. Positioning or movement of the stub may be performed continuously and/or dynamically after the signal transmission system is assembled and in operation, when conditions such as temperature or a change in broadcasted frequency alter impedance of the signal path. In this regard, signal return loss can be reduced or eliminated, preventing degradation of the broadcast signal.

In a first aspect, a device for mitigating signal return loss is provided. The device comprises a radio transmitter configured to measure voltage standing wave ratio (VSWR) and compute associated signal return loss, a radio antenna configured to broadcast over air a radio signal generated by the radio transmitter, and a signal transmission line that couples the radio transmitter to the radio antenna. The signal transmission line is configured to transmit the radio signal to the radio antenna along a signal path. A positioning stub is provided, and the positioning stub is coupled to the radio transmitter, the signal transmission line, and the radio antenna. The positioning stub is configured to move to different locations along the signal path to dynamically change the impedance of the signal path during operation of the antenna, to minimize return loss.

In a second aspect, an apparatus for mitigation of signal return loss is provided. The apparatus comprises a radio transmitter configured to selectively measure VSWR and compute associated signal return loss, a radio antenna configured to broadcast over air a radio signal generated by the radio transmitter, and a signal transmission line that couples the radio transmitter to the radio antenna. The signal transmission line is configured to transmit the radio signal to the radio antenna along a signal path. A positioning stub is also provided. The positioning stub may be selectively coupled to the radio transmitter, the signal transmission line, and the radio antenna. The positioning stub may be positioned at different locations along the signal path to dynamically match the impedance of the signal path to that of the antenna, to minimize return loss.

In a third aspect, a method for mitigation of return loss during signal transmission is provided. The method comprises providing a radio transmitter configured to selectively measure VSWR and compute signal return loss, providing a radio antenna configured to broadcast over the air a radio signal generated by the radio transmitter, and coupling a signal transmission line to the radio transmitter and to the radio antenna, wherein the transmission line is configured to transmit the radio signal to the antenna along a signal path. The method further comprises coupling a positioning stub to the radio transmitter, the signal transmission line, and the radio antenna at a first location along the signal path. The positioning stub is configured such that it can move to different locations along the signal path to dynamically change the impedance of the signal path, and match the impedance of the signal path to a set impedance, to minimize return loss. The method further comprises computing a first signal return loss along the signal path, determining if the first signal return loss is higher than a predetermined threshold of signal return loss, and upon determining that the first signal return loss is higher than the predetermined threshold, moving the positioning stub from the first location to a second location to change the impedance of the signal path.

Throughout this disclosure, several acronyms and shorthand notations may be used. These acronyms and shorthand notations are solely intended for the purpose of providing an easy methodology of communicating the ideas expressed herein and are in no way meant to limit the scope of the present invention. The following is a list of these acronyms:

SWR Standing Wave Ratio
VSWR Voltage Standing Wave Ratio
RF Radio Frequency
RT Radio Transmitter
RA Radio Antenna
TL Transmission Line
RL Return Loss
Γ Return Loss

BRIEF DESCRIPTION OF THE SEVERAL VIEWS OF THE DRAWINGS

Illustrative embodiments of the present invention are described in detail below with reference to the attached drawing figures, which are incorporated by reference herein. In reference to the figures.

DETAILED DESCRIPTION

Figure 1:
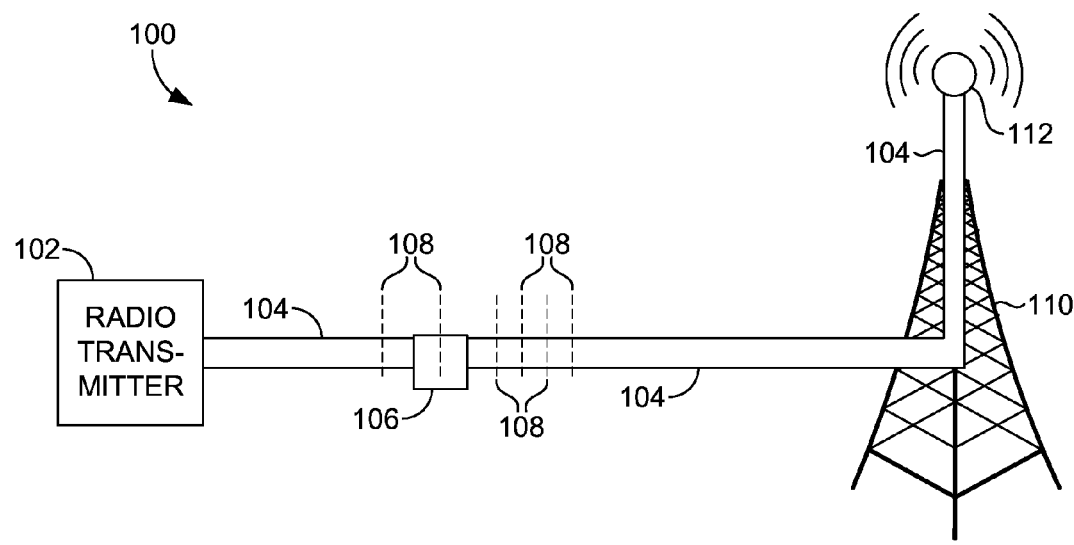
FIG. 1 is an exemplary embodiment of a device for mitigating signal return loss, in accordance with an aspect hereof.

The subject matter of the various embodiments of the present invention is described with specificity herein to meet statutory requirements. However, the description is not intended to limit the scope of claims. Rather, the claimed subject matter may be embodied in various other ways to include different features, components, elements, combinations, and steps, similar to the ones described in this document, and in conjunction with other present and future technologies. Terms should not be interpreted as implying any particular order among or between various steps disclosed herein unless the stated order of steps is explicitly required. Many different arrangements of the various components depicted, as well as use of components not shown, are possible without departing from the scope of the claims below.

Impedance, Standing Wave Ratio, and Return Loss

Impedance matching occurs when the input impedance of an electrical load and/or the output impedance of the corresponding signal source are aligned to maximize power transfer or minimize signal return loss from the load. As discussed above, return loss is the loss of power in a transmitted signal due to part of the signal being reflected or returned to the source. As a result, in the example of a radio transmitter, all of the power supplied by the transmitter is not being transmitted to the source, or the radio antenna. Return loss is usually computed in decibels. Return loss ($\Gamma$) can be calculated from a measured VSWR using the following equation:

$$\Gamma = \left| \frac{1 - VSWR}{1 + VSWR} \right|$$

Standing wave ratio ("SWR") is a measure of impedance matching of loads in a transmission system. Impedance mismatching in radio frequency or telecommunications transmission results in standing waves along the signal transmission line. The SWR is defined as the ratio of a partial standing wave's amplitude to an antinode (the point of maximum amplitude between two adjacent nodes in a standing wave). The SWR is usually provided in terms of the maximum and minimum AC voltages along the transmission line, which is the VSWR. As an example, a VSWR of 1.2:1 denotes an AC voltage along a transmission lines that reaches a peak value of 1.2 times that of the minimum AC voltage along that line, due to standing waves.

In telecommunications and radio signal transmission, SWR is used as a measure of impedance matching of a load to the characteristic impedance of a signal path carrying the signal. Along a transmission line, the impedance of the signal path is usually adjusted to match the impedance of the antenna, which is often set to 50Ω, the resistance of air, over which the signal will be broadcast. Thus, keeping the impedance of each of the components matched to the set impedance, in this case 50Ω, should occur to minimize signal return loss, and subsequent degradation of the signal broadcast by the antenna. In a more detailed aspect, impedance matching is achieved when the source (antenna) impedance is a complex conjugate of the load (transmitted signal). The easiest way to achieve this and minimize losses in the transmission line is for both the source and the load to be real, or rather, pure resistances, equal to the characteristics of the signal transmission line.

When there is a mismatch between the load impedance and the signal transmission line impedance, part of the forward wave sent toward the load is reflected back along the transmission line towards the radio transmitter. The radio transmitter then sees a different impedance than it expects which can lead to lesser (and sometimes more) power being supplied by the radio transmitter. The mismatch of impedances along the signal path, and the resulting standing waves along the transmission line, magnifies transmission line losses. This effect is increased at higher frequencies and over longer transmission distances, which is a particular notable factor in telecommunications and radio transmission, where signals typically must travel long distances. Impedance can be calculated using the following equation:

$$Z_{in}(l) = Z_0 \frac{Z_L + jZ_0 \tan(\beta l)}{Z_0 + jZ_L \tan(\beta l)}$$

Where $Z_{in}$ is the input impedance, $Z_0$ is the characteristic impedance, $Z_L$ is the load impedance, and (l) is the transmission distance.

The SWR is a measure of the depth of the standing waves and is therefore a measure of the matching of the load to the transmission line. A matched load would result in a SWR of 1:1, implying that there is no reflected wave. An infinite SWR represents complete reflection by a load unable to absorb electrical power, with all of the electrical power reflected back towards the source. Therefore, impedance matching of each of the components in the radio or telecommunications transmission system must be accomplished to minimize return loss, maximize power output of the antenna, and maximum coverage area of the broadcasted signal.

Mitigating Signal Return Loss Using a Positioning Stub

In a broad aspect, one or more positioning stubs are provided to allow matching of impedances between different components of a signal transmission system comprising at least a radio transmitter, a signal transmission line, and a radio antenna, to minimize signal return loss. The stub may be coupled to the transmission system at one of a plurality of locations along the signal path. In this regard, the stub may be moved to, or positioned at, different locations along the signal path to change the impedance of the signal path. Specifically, by changing distance of the stub from the radio transmitter, the VSWR is changed, allowing the impedance of the signal path to be matched to the impedance of the antenna. As a result, the stub provides an inexpensive solution for improving network performance that can be easily installed and adjusted during operation of the signal transmission system.

In a first aspect, a device for mitigating signal return loss is provided. The device comprises a radio transmitter configured to measure VSWR and compute associated signal return loss, a radio antenna configured to broadcast over air a radio signal generated by the radio transmitter, and a signal transmission line that couples the radio transmitter to the radio antenna. The signal transmission line is configured to transmit the radio signal to the radio antenna along a signal path. A positioning stub is provided, the positioning stub coupled to the radio transmitter, the signal transmission line, and the radio antenna. The positioning stub is configured to move to different locations along the signal path to dynamically change the impedance of the signal path.

The positioning stub may be coupled or secured directly to the radio transmitter, the transmission line, or the radio antenna. The stub may be at least partially integrated into or around the part of the signal path at which it is located, such as a part of the signal transmission line. The coupling may include a securement component for maintaining the position of stub. The securement component may be configured to selectively affix the stub to the radio transmitter, transmission line, or radio antenna, or some juncture therebetween. As an example, the stub may be coupled at a cable juncture between the signal transmission line and the radio transmitter, or a cable juncture between the signal transmission line and the radio antenna. The stub may be interchangeable, and may be selected based on desired impedance matching characteristics. The stub may be selectively coupled to the system, such that it can be removed and secured at one of a plurality of different locations at different points along the signal path from the radio transmitter to the radio antenna. The locations may be pre-fitted or pre-spaced, for easy attachment. Alternatively, the stub may be movably coupled to the signal path, even slidably coupled, such that the stub can be moved to different locations along the signal path without decoupling from the radio transmitter, the transmission line, and the radio antenna. In this regard, continuous measurement of the VSWR and computation of signal return loss may be possible during positioning of the stub. Many different attachment and movement options can be used to integrate the stub into the signal path to dynamically adjust impedance.

The stub may be configured such that moving the stub along the signal path is performed manually by an operator, or mechanically by a movement mechanism coupled to the stub and configured to move the stub to different locations along the signal path. The movement mechanism may be configured to receive stub positioning commands from an operator, or to receive stub positioning commands from the radio transmitter, in response to measured signal return loss. The radio transmitter may be configured to measure VSWR, compute signal return loss, and compare the computed signal return loss to a predetermined threshold to determine when and where the stub should be moved. In this regard, the radio transmitter may be configured to send movement commands to the stub based on the computed signal return loss, matching impedances autonomously. The stub and movement mechanism may be contained at least partially within the radio transmitter or radio antenna, such that operation, control, and maintenance of the stub to match impedances is performed substantially in one location along the signal path, controlled at least in part by the radio transmitter.

The stub may also be coupled to the radio transmitter, the transmission line, and the radio antenna using a connector tee. The connector tee may be coupled anywhere on the signal path, including directly to the radio transmitter, the transmission line, and the radio antenna, or to a junction between, to allow easy connection and manipulation of the stub. The tee may allow the stub to be movably and/or slidably coupled to the transmission line, such that its position along the signal path may be easily adjusted. The tee may also be attached to an adjustment track, or rather a pre-set distance along which the tee and/or the stub can move. The tee may also allow an operator to easily decouple the stub and move it to a different location on the signal path.

Furthermore, one or more additional stubs may be used or integrated into the signal transmission system to allow multiple components for matching impedances and minimizing return loss. Providing multiple stubs may allow more convenient adjustment by operators or maintenance personnel, and may also provide backup adjustment components in case of damage or inaccessibility to other stubs or impedance matching components.

In a second aspect, an apparatus for mitigation of signal return loss is provided. The apparatus comprises a radio transmitter configured to selectively measure VSWR and compute associated signal return loss, a radio antenna configured to broadcast over air a radio signal generated by the radio transmitter, and a signal transmission line that couples the radio transmitter to the radio antenna. The signal transmission line is configured to transmit the radio signal to the radio antenna along a signal path. A positioning stub is provided that may be selectively coupled to the radio transmitter, the signal transmission line, and the radio antenna.

By selectively coupling the positioning stub to the radio transmitter, the transmission line, and the radio antenna, the configuration of the apparatus may be changed to control the position of the stub manually or mechanically. The stub may be selectively positioned at established mounting points, or rather, fixed attachment points, which may include securement features. The stub may be moved and positioned manually or mechanically, and if moved mechanically, may be moved or controlled by an operator, the radio transmitter, or some other control unit. The radio transmitter or other component may measure VSWR and compute return loss. In this regard, the return loss computing component may be integrated into the signal path or coupled to the system to provide real time feedback to an operator or to the radio transmitter, whatever is controlling the position of the stub, and can be used to actively adjust the one or more stubs to match impedances of the signal path to the radio antenna. By adjusting the position of the stub, the impedance of the signal path can be matched to the selected impedance of the antenna, reducing signal return loss. The stub can be adjusted continuously, even after assembly of the transmission system, throughout operation of the antenna.

In this regard, the stub is different than a transmatch, or antenna tuning device. In circumstances where the signal transmission system is in operation and the impedance of the signal path has changed unexpectedly, the stub can be used to correct the mismatched impedance. Something such as a change in temperature, or a change in the characteristics of a co-axial transmission cable, a loosened cable connection, or a change in broadcast frequency, can mismatch impedances in the system, increasing return loss. By using the stub to dynamically and continuously adjust the impedance of the signal to match the antenna, small variations in impedance can be corrected without replacing signal transmission equipment, lowering the cost and downtime traditionally required for correcting signal return loss.

In a third aspect, a method for mitigation of signal return loss during signal transmission is provided. The method comprises providing a radio transmitter configured to selectively measure VSWR and compute signal return loss, providing a radio antenna configured to broadcast over the air a radio signal generated by the radio transmitter, and coupling a signal transmission line to the radio transmitter and to the radio antenna. The transmission line is configured to transmit the radio signal to the antenna along a signal path. The method further comprises coupling a positioning stub to the radio transmitter, the transmission line, and the radio antenna at a first location along the signal path. The positioning stub is configured such that it can move to different locations along the signal path to dynamically change the impedance of the signal path. The method further comprises computing a first signal return loss along the signal path, determining if the first signal return loss is higher than a predetermined threshold of signal return loss, and upon determining that the first signal return loss is higher than the predetermined threshold, moving the positioning stub from the first location to a second location to change the impedance of the signal path.

Additionally, after moving the positioning stub from the first location to the second location, either mechanically, manually, or otherwise, a second signal return loss may be computed from a second measured VSWR, so that a comparison can be made between the first signal return loss and the second signal return loss to determine if the movement of the positioning stub matched the impedances within the system to reduce the signal return loss to an acceptable level. This process can be iterative and performed as needed, either manually by an operator using feedback from the radio transmitter, or automatically by another component that computes signal return loss from the VSWR measured along the signal path. The radio transmitter may also be configured to perform computations to determine where the stub should be moved to properly match impedances.

In addition to a mechanical stub, when the VSWR is measured and the return loss is calculated, and it is determined that the signal return loss is above a predetermined threshold, the impedance may be matched electrically by adjusting the phase amplitude of the signal sent from radio transmitter. Adjusting and aligning the phase amplitude may allow correction of mismatched impedance within the signal path without mechanical adjustment, or as a supplement to mechanical adjustment. In one such example, after computing signal return loss and determining the signal return loss has exceeded the predetermined threshold, the amplifier in the radio transmitter may be adjusted to provide a phase delay that matches the impedance of the signal path with that of the antenna. In this regard, mechanical adjustment, electrical adjustment, or a combination of the two may be used for matching impedances in the signal path.

Referring now to FIG. 1, an exemplary embodiment 100 of a device for mitigating signal return loss is shown, in accordance with an aspect hereof. The device includes a radio transmitter 102 and a radio antenna 112 coupled by a signal transmission line 104. The radio transmitter 102 is located at ground level, and the radio antenna is positioned on top of a radio tower 110. As described above, in such an arrangement, which is common for placement of a radio antenna in a telecommunication broadcasting setup, the radio antenna 112 is located far above the ground, where access and repairs are difficult. A positioning stub 106 is coupled to the radio transmitter 102, the signal transmission line 104, and the radio antenna 112. The positioning stub 106 is configured to move to, or be positioned at, one of a plurality of different locations 108 along the signal path. When moved to the different locations 108, the impedance of the system is altered, allowing a mismatch of impedances across the signal path and the radio antenna to be corrected, mitigating return loss across the signal path. The radio transmitter 102 is configured to measure VSWR across the signal path and compute associated signal return loss.

Figure 2:
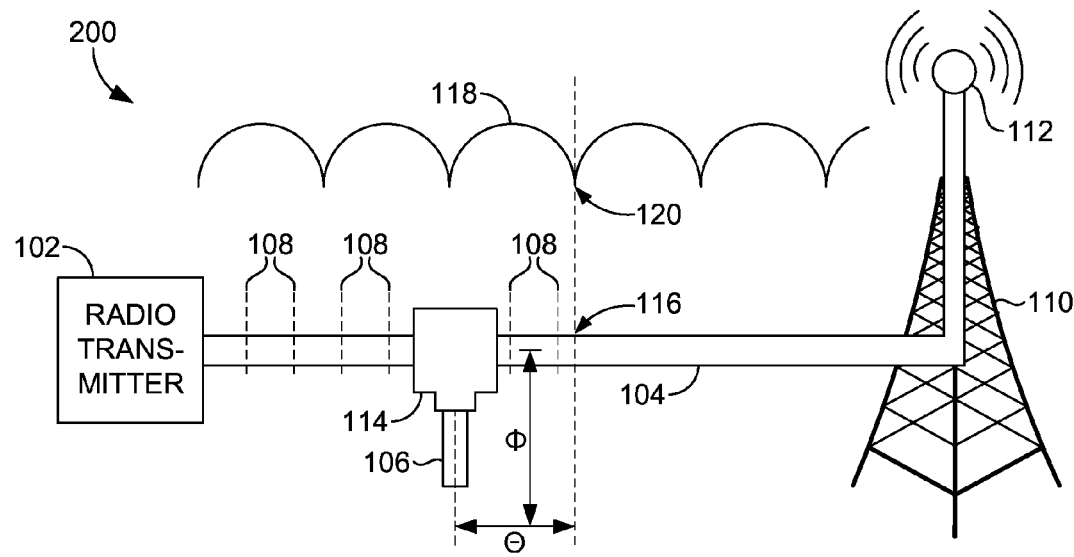
FIG. 2 is an exemplary embodiment of a device for mitigating signal return loss, showing SWR versus the position of a stub, in accordance with an aspect hereof.

Referring now to FIG. 2, an exemplary embodiment 200 of a device for mitigating signal return loss, showing the SWR compared to the position of the stub, is shown, in accordance with an aspect hereof. The device includes a radio transmitter 102, a radio antenna 112, and a signal transmission line 104 coupling the radio transmitter 102 and the radio antenna 112 such that there is a continuous signal path from the radio transmitter 102 to the radio antenna 112. The radio antenna 112 is positioned at the top of a radio tower 110, as described in relation to FIG. 1. A positioning stub 106 is shown coupled to the radio transmitter 102, radio antenna 112, and the signal transmission line 104. The positioning stub 106 is coupled to the signal transmission line 104 through a tee 114. The tee 114 allows adjustment of the positioning stub 106 to one of a plurality of different locations 108 along the signal path. By adjusting the tee 114 to different locations 108, the impedance of the signal path can be altered. FIG. 2 also depicts the SWR 118 of the transmitted signal in relation to the position of the stub 106 relative to the radio transmitter 102. As the stub 106 is moved to a position closer to or farther from the radio transmitter 102, the single amplitude changes, and when the stub 106 reaches a point 116, the standing wave ratio is at the lowest point 120. In this regard, movement of the stub 106 versus the measured SWR 118 is shown.

Figure 3:
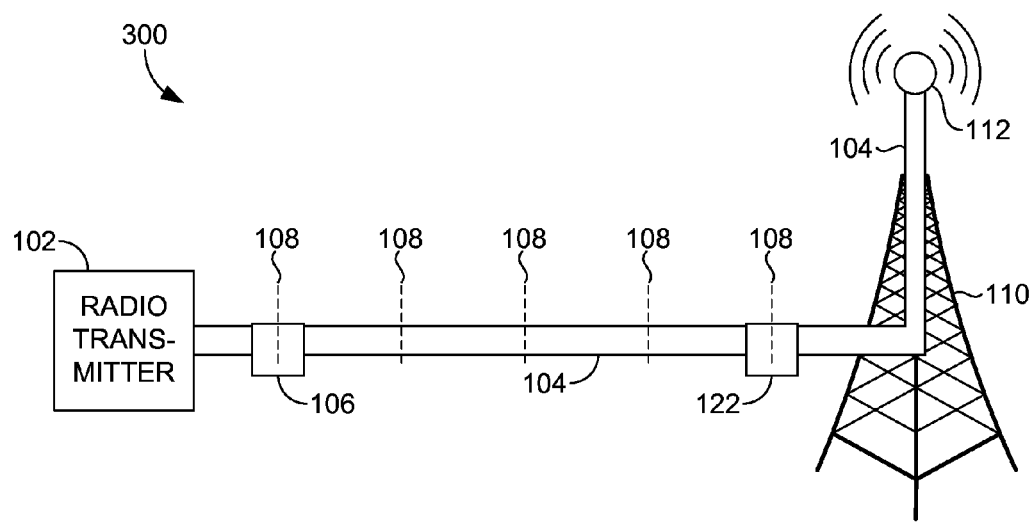
FIG. 3 shows an exemplary embodiment of a device for mitigating signal return loss featuring two positioning stubs, in accordance with an aspect hereof.

Referring to FIG. 3, an exemplary embodiment 300 of a device for mitigating signal return loss featuring two positioning stubs is shown, in accordance with an aspect hereof. The device includes a radio transmitter 102, a radio antenna 112, and a signal transmission line 104, as described above. A first positioning stub 106 and a second positioning stub 122 are shown coupled to the transmission line 104 towards opposite ends of the transmission line 104 along the signal path. In this example, the different positioning stubs 106, 122 are spaced such that they are separately accessible, in case use of one of the stubs 106, 122 is preferred. The stubs 106, 122 may each be positioned at one of a plurality of locations 108 along the signal path. The stubs 106, 122 can be moved together or separately to adjust and match impedances. Additional stubs may be installed if needed or desired.

Figure 4:
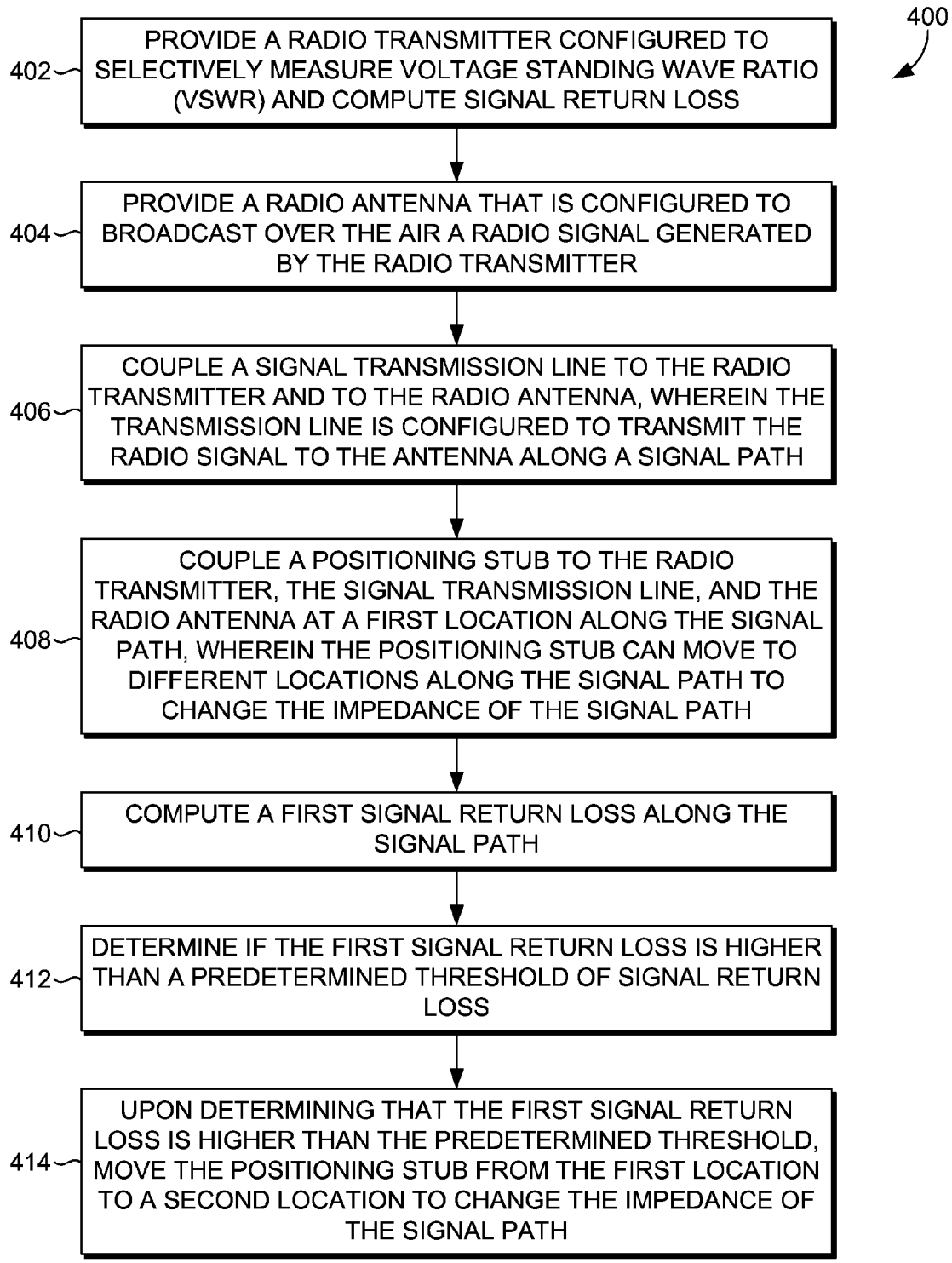
FIG. 4 is a flow diagram of an exemplary method of mitigating signal return loss, in accordance with an aspect hereof.

Referring to FIG. 4, a flow diagram showing an exemplary method of mitigating signal return loss is shown, in accordance with an aspect hereof. At a step 402, a radio transmitter, such as the radio transmitter 102 shown in FIG. 1, is configured to selectively measure VSWR and compute signal return loss. At a step 404, a radio antenna, such as the radio antenna 112 shown in FIG. 1, that is configured to broadcast over the air a radio signal generated by the radio transmitter, is provided. At a step 406, a signal transmission line, such as the signal transmission line 104 shown in FIG. 1, is coupled to the radio transmitter and to the radio antenna, with the transmission line configured to transmit the radio signal to the antenna along a signal path. At a step 408, a positioning stub, such as the positioning stub 106 shown in FIG. 1, is coupled to the radio transmitter, the signal transmission line, and the radio antenna at a first location along the signal path, wherein the positioning stub can move to different locations along the signal path to change the impedance of the signal path. At a step 410, a first signal return loss along the signal path is computed. At a step 412, it is determined if the first signal return loss is higher than a predetermined threshold of signal return loss. At a step 414, upon determining that the first signal return loss is higher than the predetermined threshold of signal return loss, the positioning stub is moved from the first location to a second location to change the impedance of the signal path. As discussed herein, this process may be performed iteratively, recursively, continuously or as needed, to optimize impedances of the components of the signal transmission system, minimizing signal return loss. The process is inexpensive and effective compared to traditional repairs to fix signal return loss, and can thus be performed more often to keep signal return loss to a minimum.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated as within the scope of the claims. Not all steps listed in the various figures need be carried out in the specific order described.

The invention claimed is:

1. A system for mitigating signal return loss, the system comprising:
    a radio transmitter configured to measure voltage standing wave ratio (VSWR) and compute associated signal return loss;
    a radio antenna configured to broadcast over air a radio signal generated by the radio transmitter;
    a signal transmission line that couples the radio transmitter to the radio antenna, wherein the signal transmission line is configured to transmit the radio signal to the radio antenna along a signal path; and
    a positioning stub coupled to the radio transmitter, the signal transmission line, and the radio antenna, the positioning stub configured to move to different locations along the signal path to dynamically change an impedance of the signal path, wherein the radio transmitter is further configured to:
        compute a first signal return loss along the signal path,
        determine if the first signal return loss is higher than a predetermined threshold of signal return loss, and
        upon determining that the first signal return loss is higher than the predetermined threshold, determine that the positioning stub should be moved from a first location to a second location to change the impedance of the signal path.

2. The system of claim 1, wherein the positioning stub is integrated such that it can be moved to adjust the impedance of the signal path when the radio antenna is broadcasting the radio signal.

3. The system of claim 1, further comprising a movement mechanism coupled to the positioning stub and configured to move the positioning stub to the different locations along the signal path.

4. The system of claim 3, wherein the radio transmitter is configured to control the movement mechanism.

5. The system of claim 1, further comprising a tee connector coupled to the signal transmission line, wherein the positioning stub is coupled to the signal transmission line via the tee connector, and the tee connector is configured to move to the different locations along the signal transmission line.

6. The system of claim 1, wherein the positioning stub is slidably movable to the different locations along the signal path.

7. The system of claim 1, wherein the radio transmitter further comprises a plurality of signal ports and the signal transmission line is coupled to the radio transmitter through one of the plurality of signal ports.

8. The system of claim 1, wherein the positioning stub is located at least partially within the radio transmitter.

9. The system of claim 1, wherein the radio transmitter is configured to control movement of the positioning stub to reduce signal return loss by aligning the impedance of the signal path with an impedance of the radio antenna.

10. The system of claim 1, further comprising a securing component for securing the positioning stub to at least one of the radio transmitter, the signal transmission line, and the radio antenna.

11. A system for mitigation of signal return loss, the system comprising:
    a radio transmitter configured to selectively measure voltage standing wave ratio (VSWR) and compute associated signal return loss;
    a radio antenna that is configured to broadcast over air a radio signal generated by the radio transmitter;
    a signal transmission line that couples the radio transmitter to the radio antenna, wherein the signal transmission line is configured to transmit the radio signal to the radio antenna along a signal path; and
    a positioning stub coupled to the radio transmitter, the signal transmission line, and the radio antenna, wherein the positioning stub can dynamically change the impedance of the signal path when positioned at different locations along the signal path, and wherein the radio transmitter is further configured to:
        compute a first signal return loss along the signal path,
        determine if the first signal return loss is higher than a predetermined threshold of signal return loss, and
        upon determining that the first signal return loss is higher than the predetermined threshold, move the positioning stub from a first location to a second location to change the impedance of the signal path.

12. The system of claim 11, further comprising multiple attachment points along the signal path at which the positioning stub may be selectively coupled.

13. The system of claim 11, wherein the positioning stub is configured to move to the different locations along the signal path while remaining continuously coupled to the radio transmitter, the signal transmission line, and the radio antenna.

14. The system of claim 11, further comprising one or more additional positioning stubs coupled to the radio transmitter, the signal transmission line, and the radio antenna, the one or more positioning stubs configured to move to the different locations along the signal path.

15. The system of claim 11, wherein the positioning stub is interchangeable with positioning stubs having different impedance characteristics.

16. The system of claim 11, wherein the radio transmitter is configured to move the positioning stub to align the impedance of the signal path with an impedance of the radio antenna.

17. The system of claim 11, further comprising a securing component for securing the positioning stub to at least one of the radio transmitter, the signal transmission line, and the radio antenna.

18. A method for mitigation of return loss during signal transmission, the method comprising:
    providing a radio transmitter configured to selectively measure voltage standing wave ratio (VSWR) and compute signal return loss;
    providing a radio antenna that is configured to broadcast over the air a radio signal generated by the radio transmitter;
    coupling a signal transmission line to the radio transmitter and to the radio antenna, wherein the transmission line is configured to transmit the radio signal to the antenna along a signal path;
    coupling a positioning stub to the radio transmitter, the signal transmission line, and the radio antenna at a first location along the signal path, wherein the positioning stub can move to different locations along the signal path to dynamically change the impedance of the signal path;

computing a first signal return loss along the signal path;

determining if the first signal return loss is higher than a predetermined threshold of signal return loss; and upon determining that the first signal return loss is higher than the predetermined threshold, moving the positioning stub from the first location to a second location to change the impedance of the signal path.

19. The method of claim 18, further comprising computing a second return loss after moving the positioning stub to the second location.

20. The method of claim 18, wherein the positioning stub is configured to move to the different locations along the signal path while remaining continuously coupled to the radio transmitter, the signal transmission line, and the radio antenna.

* * * * *